United States Patent
Barton et al.

(10) Patent No.: US 11,729,220 B2
(45) Date of Patent: Aug. 15, 2023

(54) USER TRUST SCORING FOR NETWORK ACCESS CONTROL

(71) Applicant: Cisco Technology, Inc., San Jose, CA (US)

(72) Inventors: Robert E. Barton, Richmond (CA); Bart A. Brinckman, Nevele (BE); Jerome Henry, Pittsboro, NC (US); Carlos M. Pignataro, Cary, NC (US); Nagendra Kumar Nainar, Morrisville, NC (US); Matthew MacPherson, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 17/301,928

(22) Filed: Apr. 19, 2021

(65) Prior Publication Data

US 2022/0337629 A1    Oct. 20, 2022

(51) Int. Cl.
*H04L 9/40*    (2022.01)

(52) U.S. Cl.
CPC .............. *H04L 63/20* (2013.01); *H04L 63/08* (2013.01)

(58) Field of Classification Search
CPC . H04L 63/08; H04L 63/0815; H04L 63/1425; H04L 63/20; H04L 63/10; H04L 63/083
USPC ............................................................ 726/1
See application file for complete search history.

(56) References Cited

U.S. PATENT DOCUMENTS

| | | |
|---|---|---|
| 2015/0067813 A1 | 3/2015 | Cha et al. |
| 2016/0119327 A1 | 4/2016 | Canning et al. |
| 2020/0296143 A1 | 9/2020 | Mohamad Abdul et al. |
| 2020/0302058 A1* | 9/2020 | Kenyon ................ G06F 21/554 |
| 2020/0304503 A1* | 9/2020 | Zerrad .................. H04W 12/67 |
| 2020/0344675 A1 | 10/2020 | Gundavelli et al. |

OTHER PUBLICATIONS

"Shared Signals and Events WG," OpenID, Accessed Online Mar. 29, 2021 [openid.ne/wg/sse/].
A. Backman et al., "Push-Based Security Event Token (SET) Delivery Using HTTP draft-ietf-secevent-http-push-10," Apr. 27, 2020.
A. Backman et al., "Poll-Based Security Event Token (SET) Delivery Using HTTP draft-ietf-secevent-http-poll-09," Apr. 29, 2020.

* cited by examiner

*Primary Examiner* — Benjamin A Kaplan
(74) *Attorney, Agent, or Firm* — Patterson + Sheridan, LLP (57) ABSTRACT

A method includes receiving, at an access node of a local network, a connection request from a device and in response to the connection request, establishing a connection with an identity provider. The device, the access node, the local network, and the identity provider are members of an identity federation. The method further includes receiving an indication that the device previously violated a network policy of a network different from the local network and after the device is authenticated with the identity provider, determining, by the access node and based on the indication, whether to allow the device to communicate over the access node.

20 Claims, 3 Drawing Sheets

USER TRUST SCORING FOR NETWORK ACCESS CONTROL

TECHNICAL FIELD

Embodiments presented in this disclosure generally relate to network communications. More specifically, embodiments disclosed herein network access control.

BACKGROUND

Identity federations, such as OpenRoaming, increase the mobility of devices by allowing the devices to connect to many different, geographically separated networks. As the device moves from location to location, the device can authenticate itself with the federation and be granted access to the local network. The local network, however, receives little to no information about the device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes receiving, at an access node of a local network, a connection request from a device and in response to the connection request, establishing a connection with an identity provider. The device, the access node, the local network, and the identity provider are members of an identity federation. The method further includes receiving an indication that the device previously violated a network policy of a network different from the local network and after the device is authenticated with the identity provider, determining, by the access node and based on the indication, whether to allow the device to communicate over the access node. Other embodiments includes an access node that performs the method.

According to another embodiment, an apparatus includes a memory and a hardware processor communicatively coupled to the memory. The hardware processor communicates a connection request to an access node and authenticates with an identity provider. The device, the access node, and the identity provider are members of an identity federation. The hardware processor also, after authenticating with the identity provider, receives an access decision from the access node. The access decision is based on an indication that the apparatus previously violated a network policy of a network different from a local network of the access node.

Example Embodiments

A device may authenticate with identity federations (e.g., OpenRoaming) to connect to different, geographically separated networks. These networks, however, may be provided little to no information about the device. For example, the networks may not be made aware of the device's previous policy violations on other networks. The device may be a malicious device or a device that frequently ignores network policies. As an example, the device may attempt to access prohibited content or use too much bandwidth, which negatively impacts other devices on the network. The only way for the networks to determine whether the device violates network policies is for the device to violate these policies after connecting to the networks. As a result, a device may jump from network to network to commit violations.

This disclosure contemplates an access node that receives trust information for a device when the device authenticates with an identity federation. For example, an identity provider or another component of the identity federation may communicate trust information to the access node. The trust information may indicate previous network policy violations that the device committed. In some embodiments, the trust information may include a score that represents the trust level of the device. Based on the trust information, the access node may determine whether to grant or deny the device access. For example, the access node may deny the device access if the access node determines from the trust information that the device has violated policies of another network. As another example, the access node may grant the device access despite the device's previous network violations if the access node determines that the violations related to a network policy that is not applicable to the access node. In this manner, the access node may prevent malicious activity, which improves network performance, in certain embodiments.

Figure 1:
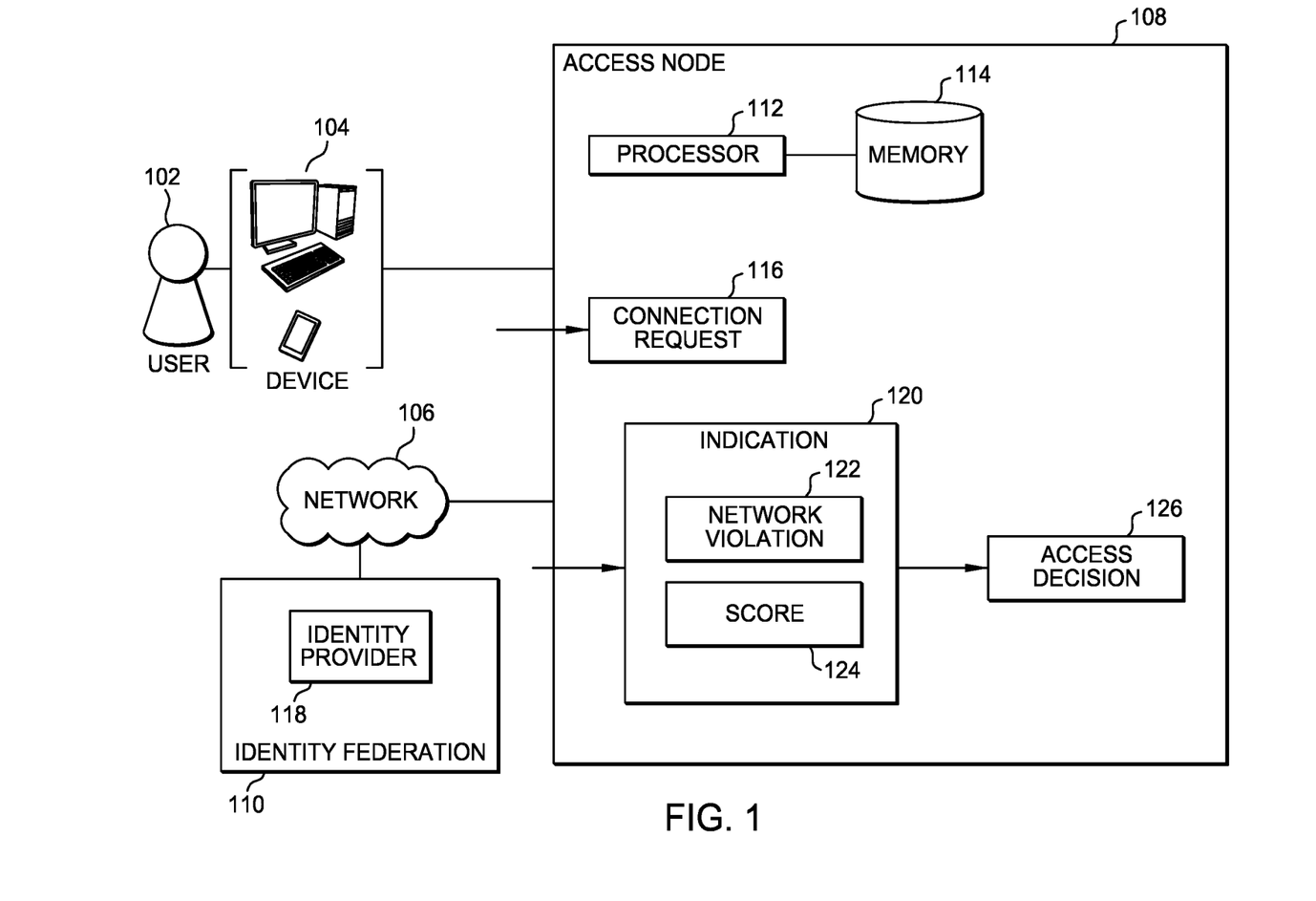
FIG. 1 illustrates an example system.

FIG. 1 illustrates an example system 100. As seen in FIG. 1, the system 100 includes one or more devices 104, a network 106, an access node 108, and an identity federation 110. Generally, the access node 108 provides a device 104 access to the network 106 after the device 104 is authenticated with the identity federation 110. The access node 108 may be provided trust information about the device 104 after the device 104 is authenticated. The access node 108 may then determine whether to grant the device 104 access to the network 106 based on the trust information. In this manner, the access node 108 may be informed of the previous behavior of the device 104 and make an access decision accordingly. In particular embodiments, using the trust information to make an access decision improves the security and operation of the network 106 by preventing malicious devices from connecting to the network 106.

A user 102 may use a device 104 to connect to the network 106 through the access node 108. The device 104 may communicate messages through the network 106 via the access node 108. The device 104 may be granted access to the network 106 and the access node 108 after the device 104 is authenticated with an identity federation 110. The device 104 includes any suitable device for communicating with components of the system 100 over the network 106.

As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The device 104 establishes a connection with the access node 108 before the device is allowed to send communications over the network 106 through the access node 108. The access node 108 may broadcast an identifier of the access node 108 or of the network 106. When the user 102 or the device 104 moves within a service region of the access node 108, the device 104 may detect the broadcasted identity of the access node 108 or the network 106. The user 102 or the device 104 may then attempt to connect to the network 106 through the access node 108. The access node 108 may then determine whether access should be allowed. For example, the access node 108 may authenticate the user 102 or the device 104 before allowing the connection from the device 104.

In certain embodiments, the device 104, the access node 108, and the network 106 belong to the identity federation 110 (e.g., OpenRoaming), which may be a trusted third party service that is responsible for authenticating the user 102 or the device 104. In these embodiments, the third party service provides one or more identity providers 118, and the device 104 and the access node 108 rely on the identity providers 118 to authenticate the user 102 and the device 104. For example, when authentication is needed, the access node 108 may open a communication channel between the device 104 and an identity provider 118 through the network 106. The identity provider 118 may then authenticate the device 104. For example, the device 104 may provide credentials (e.g., credentials of the user 102 or of the device 104) to the identity provider 118. The identity provider 118 may use these credentials to authenticate the user 102 or the device 104. The identity provider 110 may then provide an identifier (e.g., a token) to indicate that the user 102 or device 104 is authenticated. The identity provider 118 may provide the identifier to the access node 108 or the device 104. If the identifier is provided to the access node 108, then the access node 108 may use the identifier to determine the identity of the user 102 or the device 104. The identity provider 118 serves as an intermediary between the network 106 and the user 102 or device 104, where the trust between the identity provider 118 and the network 106 can be leveraged to also establish trust between the network 106 and the user 102 or device 104. The access node 108 may then establish a communication session with the device 104. If the identifier is provided to the device 104, the device 104 may communicate the identifier to the access node 108. The access node 108 may then use the identifier to identify the user 102 or the device 104 and to establish a communication session with the device 104. In this manner, the user 102 or device 104 may connect to any access node 108 or network 106 that belongs to the identity federation 110. Additionally, the access nodes 108 and networks 106 that belong to the identity federation 110 do not need to store and maintain the credentials of the user 102 and device 104.

After the device 104 is authenticated with the identity federation 110, trust information for the device 104 may be supplied to the access node 108. The trust information may indicate previous violations of network policies that the device 104 committed. An access decision may then be made based on this trust information. The trust information keeps the device 104 accountable for the violations that the device 104 committed previously. In this manner, the device 104 is prevented from jumping from network to network to commit violations in particular embodiments.

The network 106 allows the device 104 to communicate messages to other devices 104 or other networks 106. The device 104 may access the network 106 through the access node 108. The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The access node 108 controls access to the network 106. Generally, the access node 108 uses trust information about a device 104 to determine whether the device 104 should be granted access to the network 106. In particular embodiments, the access node 108 improves the security and operation of the network 106 by denying access to devices 104 whose trust information indicates that the devices 104 have committed numerous or severe network violations previously. As seen in the example of FIG. 1, the access node 108 includes a processor 112 and a memory 114, which are configured to perform any of the actions or functions of the access node 108 described herein.

The processor 112 is any electronic circuitry, including, but not limited to microprocessors, application specific integrated circuits (ASIC), application specific instruction set processor (ASIP), and/or state machines, that communicatively couples to memory 114 and controls the operation of the access node 108. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on memory to perform any of the functions described herein. The processor 112 controls the operation and administration of the access node 108 by processing information (e.g., information received from the devices 104, network 106, and memory 114). The processor 112 may be a programmable logic device, a microcontroller, a microprocessor, any suitable processing device, or any suitable combination of the preceding. The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein.

The access node 108 receives a connection request 116 from a device 104 that requests access to the network 106 through the access node 108. The connection request 116 may include information that identifies the device 104. In response to receiving the connection request 116, the access node 108 may attempt to authenticate the device 104. For example, the access node 108 may open a connection with an identity provider 118 in the identity federation 110. The device 104 may then be authenticated with the identity provider 118 through the connection. For example, the device 104 may supply credentials (e.g., usernames and passwords) to authenticate with the identity provider 118.

After the device 104 is authenticated, the access node 108 may receive an indication 120 that includes trust information about the device 104. The access node 108 may receive the indication 120 from the identity provider 118 or another device in the identity federation 110. The indication 120 may include network violations 122 previously committed by the device 104. Generally, the network violation 122 may indicate instances when the device 104 violated a policy of the network 106 or another network. For example, the indication 120 may indicate that the device 104 previously attempted to access prohibited content over the network 106 or another network. As another example, the indication 120 may indicate that the device 104 previously violated a multi-user uplink policy of the network 106 or another network. As yet another example, the network violation 122 may indicate that the device 104 exceeded the bandwidth or usage limits of the network 106 or another network.

In particular embodiments, the indication 120 includes a score 124 that summarizes the trustworthiness of the device 104. The identity provider 118 or the identity federation 110 may have generated the score 124 based on previous network violations of the device 104. For example, the fewer network violations committed by a device 104, the more trustworthy the device 104 may be and the higher the score 124. The more network violations committed by the device 104, the less trustworthy the device 104 is and the lower the score 124. As another example, if a device 104 commits a severe network violation (e.g., initiating a distributed denial of service attack), the score 124 may be adjusted downwards by a large amount. If a device 104 commits a minor network violation (e.g., navigates to a prohibited website), the score 124 may be adjusted downwards a small amount. The access node 108 may analyze the score 124 to quickly reach an access decision for the device 104, without having to analyze each and every network violation 122 previously committed by the device 104.

The access node 108 may analyze the information in the indication 120 to reach an access decision 126. For example, the access node 108 may analyze the network violations 122 in the indication 120 to determine whether to grant or deny access to the device 104. For example, the access node 108 may determine that the network violations 122 in the indication 120 are violations of network policies that are inapplicable to the access node 108 or the network 106. In response, the access node 108 may disregard those network violations 122 and grant access to the device 104. As another example, the access node 108 may determine that the network violations 122 indicate violations of network policies that are applicable to the access node 108 or the network 106. In response, the access node 108 may deny access to the device 104 based on those network violations 122. As yet another example, the access node 108 may determine that the network violations 122 are not numerous or severe enough, and in response, grant access to the device 104. Additionally, the access node 108 may determine that a network violation 122 was previously committed over the network 106 and/or the access node 108. In response, the access node 108 may deny access to the device 104. The access node 108 may communicate the access decision 126 to the device 104 to notify the device 104 whether the device 104 has been granted or denied access to the network 106. In certain embodiments, the access decision 126 may further indicate reasons why the device 104 was granted or denied access to the network 106.

The identity provider 118 or another device of the identity federation 110 may implement a database that stores the network violations 122 of the device 104. Each time the identity provider 118 or the identity federation 110 is alerted of a network violation of the device 104, the identity provider 118 or the other device of the identity federation 110 update the database to include the network violation. In some embodiments, the identity provider 118 or the other device of the identity federation 110 maintains and updates the score 124 for the device 104. Based on the network violations 122 of the device 104, the identity provider 118 or the other device of the identity federation 110 may update and store the score 124 in the database. The score 124 may be adjusted based on the severity of a violation. For example, the identity provider 118 or the identity federation 110 may reduce the score 124 by a large amount if the device 104 committed a severe network violation (e.g., initiating a distributed denial of service attack). On the other hand, identity provider 118 or the identity federation 110 may reduce the score 124 by a small amount if the device 104 committed a minor network violation (e.g., navigating to a prohibited website). When the identity provider 118 or the other device of the identity federation 110 authenticate the device 104, the identity provider 118 or the other device of the identity federation 110 may retrieve the network violations 122 and/or the score 124 for the device 104 from the database and communicate that information to the access node 108.

Figure 2:
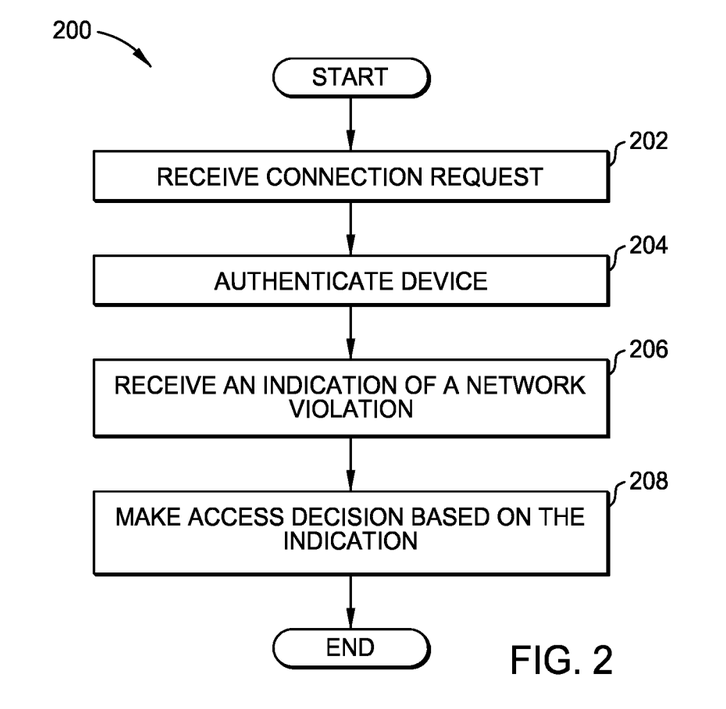
FIG. 2 is a flowchart of an example method in the system of FIG. 1.

FIG. 2 is a flowchart of an example method 200 in the system 100 of FIG. 1. The access node 108 may perform the method 200. In particular embodiments, by performing the method 200, the access node 108 improves the security and operation of the network 106 by making access decisions 126 based on previous network violations 122 of a device 104.

In block 202, the access node 108 receives a connection request 116 from a device 104. The connection request 116 may include information that identifies the device 104. The access node 108 may authenticate the device 104 with an identity provider 118 or an identity federation 110 before deciding whether to grant access to the device 104.

In block 204, the access node 108 authenticates the device 104 with the identity provider 118 or the identity federation 110. The access node 108 may open a connection with the identity provider 118 or the identity federation 110. The device 104 may supply authentication credentials to the identity provider 118 or the identity federation 110. For example, the device 104 may provide usernames and passwords to the identity provider 118 or the identity federation 110.

After the device 104 is authenticated, the access node 108 receives an indication 120 of a network violation 122 in block 206. The access node 108 may receive the indication 120 from the identity provider 118 or another device of the identity federation 110. For example, the identity provider 118 or the other device of the identity federation 110 may maintain a database that stores the previous network violations 122 of the device 104. When the identity provider 118 or the other device of the identity federation 110 authenticate the device 104, the identity provider 118 or the other device of the identity federation 110 may retrieve the network violations 122 of the device 104 from the database. The identity provider 118 or the other device of the identity federation 110 may then communicate the network violations 122 to the access node 108. The access node 108 may analyze these network violations 122 to make an access decision 126. In some embodiments, the indication 120 includes a list of the different network violations 122, their types, and when they occurred.

In certain embodiments, the indication includes a score 124 representing the trustworthiness of the device 104. The identity provider 118 or the other device of the identity federation 110 may maintain and store the score 124 in the database based on the network violations 122 of the device 104. After the device 104 is authenticated, the identity provider 118 or the other device of the identity federation 110 may retrieve the score 124 from the database and communicate the score 124 to the access node 108. The access node 108 may analyze the score 124 in making the access decision 126.

In block 208, the access node 108 makes the access decision 126 based on the indication 120. For example, the access node 108 may analyze the network violations 122 in the indication 120 to determine whether to grant or deny access to the device 104. For example, the access node 108 may determine that the device 104 should be denied access, because the network violations 122 are too numerous or too severe. As another example, the access note 108 may determine that the device 104 should be granted access, because the network violations 122 are violations of network policies that are not implemented by the access node 108 or the network 106 (e.g., access may be granted if the network violations 122 are violations of a multi-user uplink policy of another network, but the network 106 or the access node 108 do not implement such a policy). As another example, the access node 108 may deny the device 104 access, because the network violations 122 were previously committed while the device 104 was connected to the access node 108 or the network 106. In this manner, the access node 108 is informed of the previous network violations 122 of the device 104, even if the device 104 was connected to different networks when those network violations 122 were committed.

In particular embodiments, the indication of 120 includes the score 124 that represents the trustworthiness of the device 104. The access node 108 may analyze the score 124 rather than the network violations 122 to reach a quicker access decision 126. For example, the access node 108 may compare the score 124 to a threshold. If the score 124 exceeds the threshold, the access node 108 may grant the device 104 access. On the other hand, if the score 124 does not exceed the threshold the access node 108 may deny the device 104 access. In this manner, the access node 108 does not need to analyze every network violation 122 in the indication 120 to reach the access decision 126.

Figure 3:
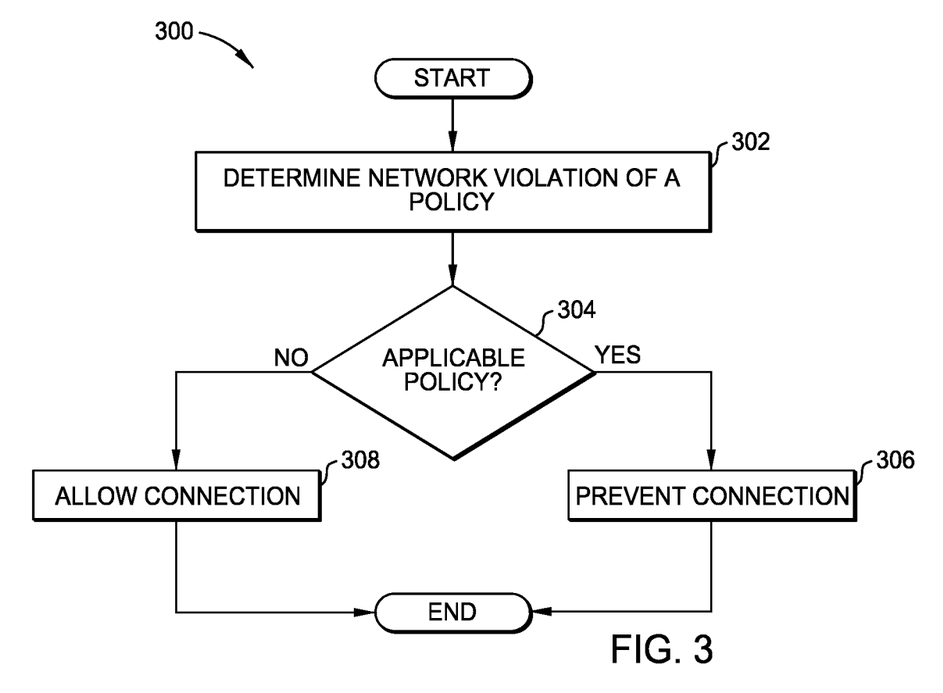
FIG. 3 is a flowchart of an example method in the system of FIG. 1.

FIG. 3 is a flowchart of an example method 300 in the system 100 of FIG. 1. The access node 108 may perform the method 300. In particular embodiments, by performing the method 300, the access node 108 may make an access decision 126 based on trust information of a device 104. The access node 108 may perform the method 300 when performing the block 208 of the method 200.

In block 302, the access node 108 determines that a network violation 122 was of a particular network policy. For example, the access node 108 may determine that the network violation 122 violated a multi-user uplink policy of a network. The access node 108 or the network 106 may or may not implement the same policy. In block 304, the access node 108 determines whether the violated policy is applicable to the access node 108 or the network 106. For example, the access node 108 may determine whether the violated policy is implemented by the access node 108 or the network 106.

If the violated policy is applicable (e.g., implemented by the access node 108 or the network 106), the access node 108 may prevent the connection from the device 104 in block 306. For example, the access node 108 may determine that the device 104 is likely to violate a policy implemented by the access node 108 or the network 106 because the device 104 previously violated the same policy on another network. In response, the access node 108 may deny access to the device 104.

If the access node 108 determines that the violated policy is not applicable (e.g., not implemented by the access node 108 or the network 106), the access node 108 may allow a connection from the device 104 in block 308. For example, the access node 108 may determine that because the access node 108 and the network 106 do not implement the violated policy, the device's 104 previous violation of that policy should not prohibit the device 104 from connecting to the network 106 through the access node 108.

Figure 4:
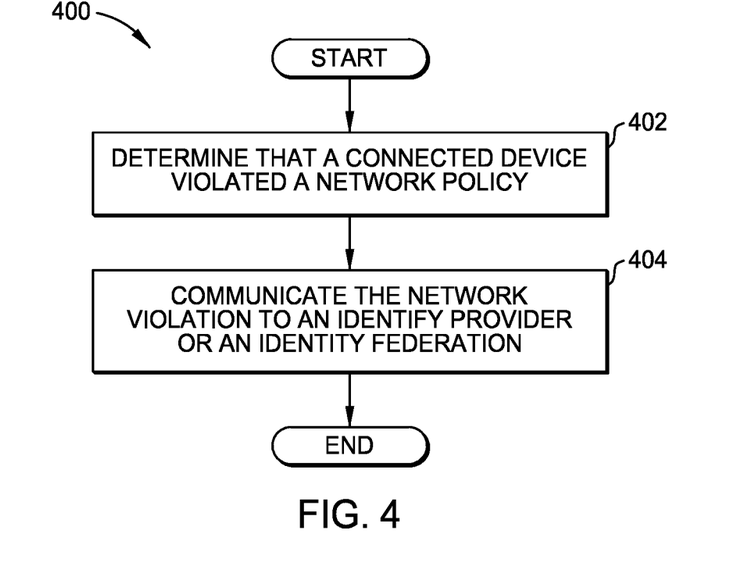
FIG. 4 is a flowchart of an example method in the system of FIG. 1.

FIG. 4 is a flowchart of an example method 400 in the system 100 of FIG. 1. The access node 108 may perform the method 400 to populate a database of indications 120 (e.g., at the identity provider 118 or the identity federation 110). In particular embodiments, by performing the method 400, the access node 108 improves the security and operation of the network 106 by informing an identity provider 118 or an identity federation 110 of network violations committed by a device 104.

In block 402, the access node 108 determines that a connected device 104 violated a network policy. For example, the access node 108 may determine that the device 104 attempted to access prohibited content. As another example, the access node 108 may determine that the device 104 ignored or opted out of a multi-user uplink policy. As yet another example, the access node 108 may determine that the device 104 exceeded bandwidth or usage limits imposed by the access node 108 or the network 106. Each of these violations may subject the access node 108 or the network 106 to security risks, slowdowns, or congestion.

In block 404, the access node 108 communicates the network violation to an identity provider 118 or an identity federation 110. When the access node 108 communicates the network violation to the identity provider 118 or the identity federation 110, the identity provider 118 or the identity federation 110 may then log the network violation of the device 104. For example, the identity provider 118 or the identity federation 110 may store the network violation in a database. The identity provider 118 or the identity federation 110 may also use the network violation to update a score indicating the trustworthiness of the device 104 in the database. In this manner, when the device 104 attempts to connect through another access node or another network, the identity provider 118 or the identity federation 110 may inform the other access node or the other network about the network violation. The other access node or the other network may then make an access decision based on that information. In this manner, the access node 108 may inform other access nodes and other networks about the network violations of the device 104, which improves the security operation of the other networks.

Figure 5:
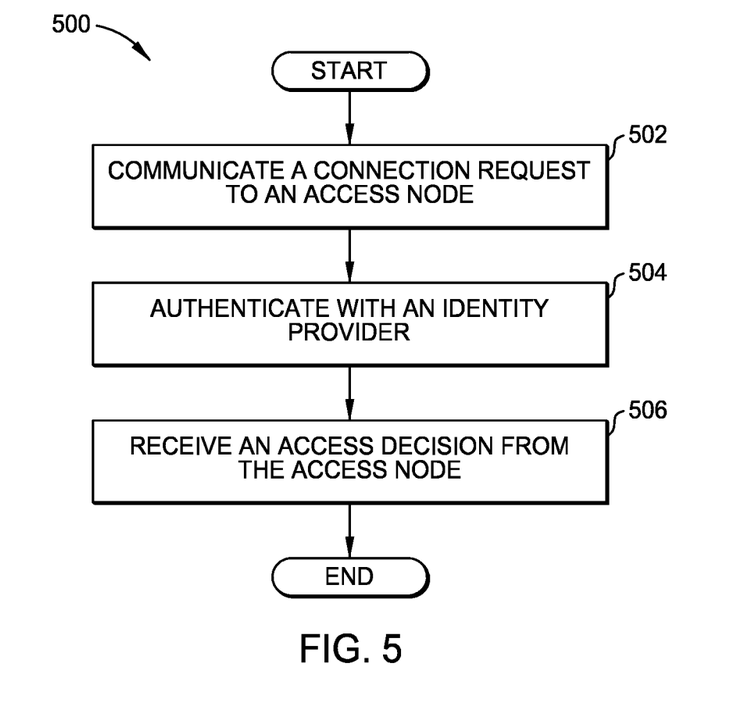
FIG. 5 is a flowchart of an example method in the system of FIG. 1.

FIG. 5 is a flowchart of an example method 500 in the system 100 of FIG. 1. The device 104 may perform the method 500. In particular embodiments, by performing the method 500, the device 104 may connect to different geographically separated networks.

In block 502, the device 104 communicates a connection request 116 to an access node 108. The connection request 116 may include information that identifies the device 104. The access node 108 may allow the device 104 to connect after the device 104 is authenticated. In block 504, the device 104 authenticates with an identity provider 118. For example, the device 104 may supply credentials (e.g., usernames or passwords) after the access node 108 opens the connection with the identity provider 118. The identity provider 118 may use the credentials to authenticate the device 104.

After the identity provider 118 has authenticated the device 104, the identity provider 118 may communicate to the access node 108 trust information about the device 104. For example, the identity provider 118 may inform the access node 108 about previous network violations of the device 104, even if those network violations were committed on other networks. The access node 108 may analyze these network violations to determine if the device 104 should be granted access to the network 106 over the access node 108. For example, the access node 108 may determine that the device 104 should be denied access, if the network violations are too numerous or too severe. As another example, the access node 108 may determine that the device 104 should be granted access if the previous network violations involved policies that are not implemented by the access node 108. In block 506, the device 104 receives an access decision 126 from the access node 108. The access decision 126 may indicate whether the device 104 has been granted or denied access to the access node 108. If the device 104 has been denied access, the device 104 may move and attempt to connect to a different network. If the device has been granted access, the device 104 may begin communicating through the access node 108.

In summary, this disclosure describes an access node 108 that receives trust information for a device 104 when the device 104 authenticates with an identity federation 110. For example, an identity provider 118 or another component of the identity federation 110 may communicate trust information to the access node 108. The trust information may indicate previous network policy violations 122 that the device 104 committed. In some embodiments, the trust information may include a score 124 that represents the trust level of the device 104. Based on the trust information, the access node 108 may determine whether to grant or deny the device 104 access. For example, the access node 108 may deny the device 104 access if the access node 108 determines from the trust information that the device 104 has violated policies of another network. As another example, the access node 108 may grant the device 104 access despite the device's 104 previous network violations if the access node 108 determines that the violations related to a network policy that is not applicable to the access node 108 (e.g., not implemented by the access node 108). As yet another example, the access node 108 may deny access to the device 104 if the access node 108 determines that the device 104 has violated policies implemented by the access node 108. In this manner, the access node 108 may prevent malicious activity, which improves network performance, in certain embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving, at an access node of a local network, a connection request from a device;
in response to the connection request, establishing a connection with an identity provider, wherein the device, the access node, the local network, and the identity provider are members of an identity federation;
receiving an indication that the device previously violated a network policy of a network different from the local network; and
after the device is authenticated with the identity provider, determining, by the access node and based on the indication, whether to allow the device to communicate over the access node.

2. The method of claim 1, further comprising allowing the device to communicate over the access node in response to determining that the network policy is inapplicable to the access node.

3. The method of claim 1, further comprising preventing the device from communicating over the access node in response to determining that the network policy is implemented by the access node.

4. The method of claim 1, further comprising:
detecting that the device committed a network violation; and
reporting the network violation to the identity provider or the identity federation.

5. The method of claim 1, wherein the indication comprises a score determined based at least on the device previously violating the network policy.

6. The method of claim 1, wherein the indication is received from the identity provider and wherein the network different from the local network reported to the identity provider that the device violated the network policy.

7. The method of claim 1, wherein the indication is received from the identity federation.

8. An access node comprising:
a memory; and
a hardware processor communicatively coupled to the memory, the hardware processor configured to:
receive a connection request from a device;
in response to the connection request, establish a connection with an identity provider, wherein the device, the access node, and the identity provider are members of an identity federation;
receive an indication that the device previously violated a policy of a network different from a local network of the access node; and
after the device is authenticated with the identity provider, determine, based on the indication, whether to allow the device to communicate over the access node.

9. The access node of claim 8, the hardware processor further configured to allow the device to communicate over the access node in response to determining that the policy is inapplicable to the access node.

10. The access node of claim 8, the hardware processor further configured to prevent the device from communicating over the access node in response to determining that the policy is implemented by the access node.

11. The access node of claim 8, the hardware processor further configured to:
detect that the device committed a network violation; and
report the network violation to the identity provider or the identity federation.

12. The access node of claim 8, wherein the indication comprises a score determined based at least on the device previously violating the policy.

13. The access node of claim 8, wherein the indication is received from the identity provider and wherein the network different from the local network reported to the identity provider that the device violated the policy.

14. The access node of claim 8, wherein the indication is received from the identity federation.

15. An apparatus comprising:
- a memory; and
- a hardware processor communicatively coupled to the memory, the hardware processor configured to:
  - communicate a connection request to an access node;
  - authenticate with an identity provider, wherein the apparatus, the access node, and the identity provider are members of an identity federation; and
  - after authenticating with the identity provider, receive an access decision from the access node, the access decision based on an indication that the apparatus previously violated a network policy of a network different from a local network of the access node.

16. The apparatus of claim 15, wherein the access decision allows communication over the access node based on a determination that the network policy is inapplicable to the access node.

17. The apparatus of claim 15, wherein the access decision prevents communication over the access node based on a determination that the network policy is implemented by the access node.

18. The apparatus of claim 15, wherein the indication comprises a score determined based at least on the apparatus previously violating the network policy.

19. The apparatus of claim 15, wherein the indication is received from the identity provider and wherein the network different from the local network reported to the identity provider that the apparatus violated the network policy.

20. The apparatus of claim 15, wherein the indication is received from the identity federation.

* * * * *